Patented Sept. 26, 1933

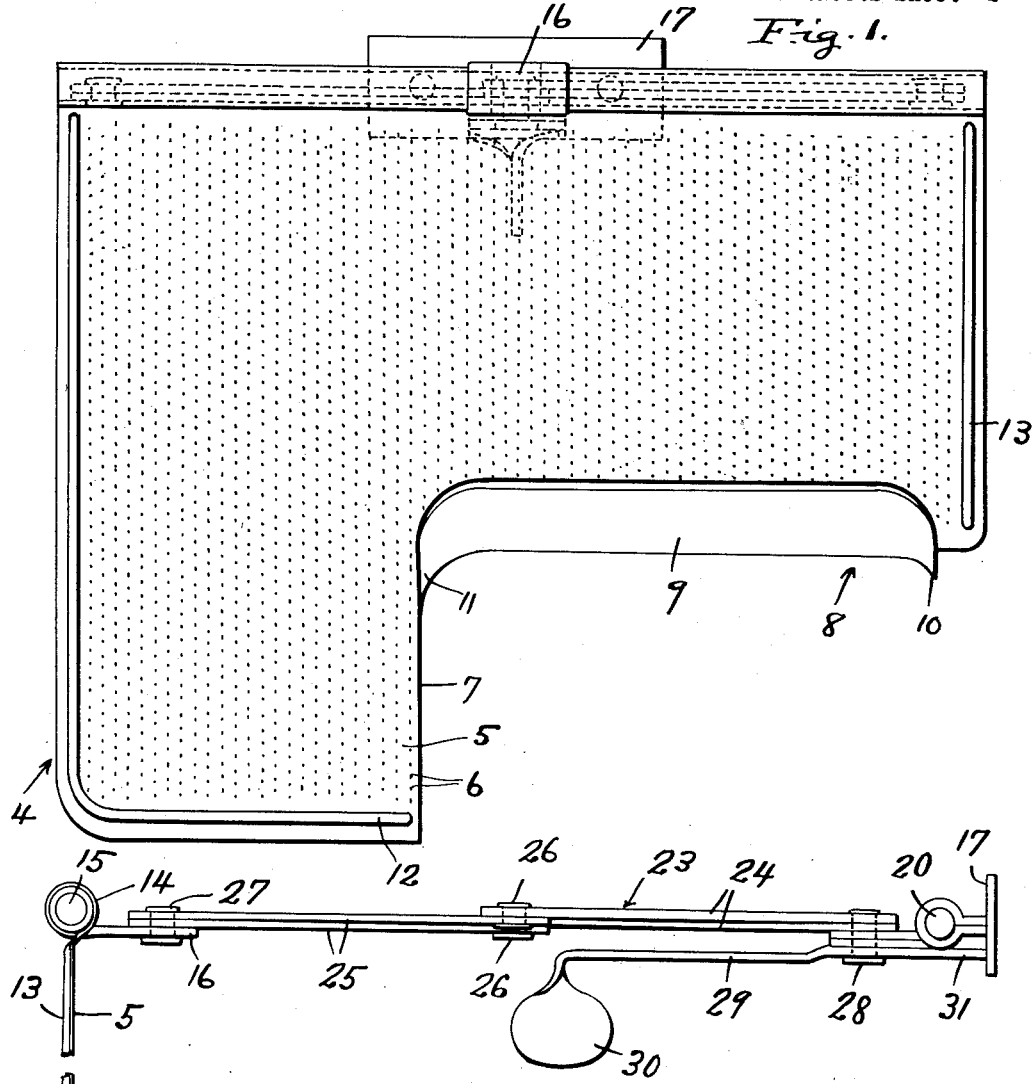
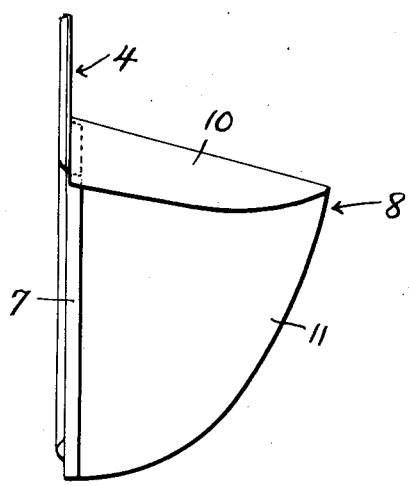

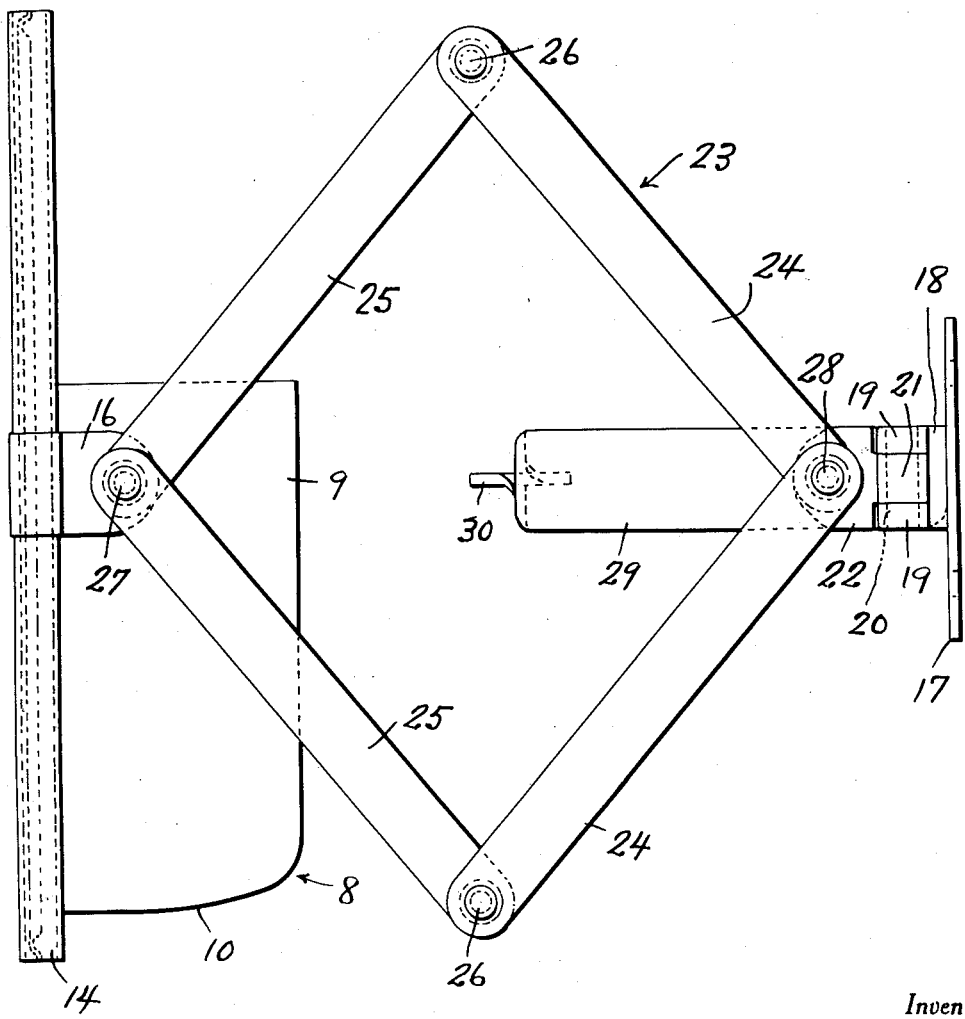

1,928,249

UNITED STATES PATENT OFFICE 1,928,249

ANTIGLARE DEVICE

Robert J. J. Eisenzopf and Robert J. Eisenzopf, Baltimore, Md.

Application February 18, 1933. Serial No. 657,448

2 Claims. (Cl. 296—97)

This invention relates to that class of automotive accessories and appurtenances referred to in the art and the trade as anti-glare means and more specifically tilted Glare shields.

These devices, as is well known, are generally attached to an automobile windshield in the line of vision of the occupants of the front seat and are adjustably and otherwise constructed for disposition in the desired place to intercept blinding light rays in such a manner as to provide the requisite diffusing results, whereby to increase the degree of safety in night driving by minimizing the blinding effects from headlights of oncoming vehicles.

Needless to say, we are well aware of the high state of development of devices in this particular line of endeavor and therefore conversant with the objections and mechanical defects characterized similar prior art device. Hence we have discovered the need of a more satisfactorily and structurally defined contribution to the art, the features and advantages of which will be evident upon considering the accompanying illustrative drawings and explanation thereof.

In the drawings wherein like numerals are employed to designate like parts throughout the same:

Figure 1 is a rear elevational view of the device as constructed in accordance with the principles of our invention observing the interceptor device in depending operative position (the same being viewed from the interior of the car).

Figure 2 is a side elevational view showing the device and the adjustable suspension means therefor.

Figure 3 is a top plan view of the complete assembly illustrated in Figure 2.

Referring now to the essential features of the construction as depicted in the drawings it will be observed that the intercept or plate or shield is generally distinguished by the numeral 4 and comprises a substantially flat sheet metal plate 5 of approximate rectangular configuration formed with a multiplicity of minute perforations 6, distributed over the entire area thereof. The inner or right hand corner portion of the plate is cut away to form what may be designated as a sight opening 7. A downwardly and outwardly inclined visor 8 is attached to the outer or front face of the shield and commensurate in proportion with the sight opening. It includes an imperforate plate 9 (see Figure 3) having a short downturned lip 10 at its outer end and a depending segmental portion 11 at the opposite end. The portion 11 is shaped and proportioned to project at approximate right angles from the plate and functions as a guard substantially closing the adjacent end portion of the sight opening in order to provide the desired hood effect.

Referring again to the perforated plate 5 it will be noted that this is formed around its marginal edges with an outwardly pressed reinforcing bead 12 and a complemental bead 13 designed to strengthen the plate. The upper edge portion of the plate is folded into a longitudinally elongated tubular knuckle 14 surrounding a horizontal supporting shaft 15. Fixedly connected to the central portion of this tube is a forwardly and horizontally projecting hanger ear or lug 16.

Attention is next called to the attaching and adjusting means. As shown at the right in Figures 2 and 3 the numeral 17 designates an attaching bracket adapted to be bolted or otherwise fastened to the windshield or that portion of the car within the vicinity of the windshield. This is provided with a projection 18 having eyes 19 carrying a fixed hinge pin 20. Surrounding the pin and located between the eyes is a hinge knuckle 21 forming a part of the hinge plate or leaf 22.

The numerals 23 designate a multiple link extensible and contractible frame, this being made up of four distinguishable links 24 and 25 arranged in pairs as shown in Figure 3. The adjacent ends of the links 24 and 25 are pivotally connected together as at 26. The corresponding ends of the links 25 are pivotally attached as at 27 to the aforementioned hanger lugs 16. The corresponding converging ends of the links 24 attached by a pivot forming rivet 28 to the hinge leaf 22. This same rivet serves to hold the retention and locking lever 29 in place. The lever is in the form of a metal strip pivoted intermediate its ends on this rivet 28 having its operating end formed with a finger grip 30 of appropriate design and its opposite end 31 positioned to swing and bind against the attaching bracket 17 as shown in the drawings. Thus it will be observed that we have a special visor equipped light interceptor shield 4 pivotally attached by a suitable fixed lug 16 to the expansible and contractible linkage frame 23, with the frame attached to the hinge leaf 22 and the hinge leaf maintained in suspension position by the pivoted retention lever 29. The principal novelty is of course predicated upon the special apertured plate 5 with a sight opening 7 and the associated visor 8 expressly fashioned and positioned to possess the requisite light shading effect. It is believed that the defraction properties of the plate 5 in conjunction with the light shading effects of the hood like visor is unique in this particular line of endeavor.

In conclusion I wish to lay stress on the particular construction of the aforementioned plate or shield 4. As before pointed out this is in the nature of a flat sheet of metal or equivalent material of screen like construction. Although the rectangular consideration of the plate is of no particular moment, special emphasis is placed on the arrangement of the minute perforations 6. These can hardly be described as apertures or openings. They are almost of infinitesmal size, in fact in the actual product the perforations are .0025 of an inch in size and are spaced apart on centers of $\frac{3}{32}$ of an inch, staggered throughout the face of the plate in orderly rows. This particular adaptation of minute perforations constitute the gist of the invention, making it satisfactorily operable for dependable light diffusing results. In experimental devices I have found that if the perforations are larger or spaced differently the results are much less effective.

Although the shield is described as applicable to a windshield within the line of vision of the driver I have found that placement of a perforated plate similar to the one shown in the drawings in the rear window of the automobile that constitutes an additional use to which the invention may be satisfactorily put.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

We claim:

1. In a structure of the class described, an attaching bracket adapted to be secured to a stationary support a leaf hingedly connected thereto, an expansible and contractible supporting frame composed of a plurality of pivotally connected links, said frame being pivotally attached to said leaf, a lever pivotally connected intermediate its ends to the under side of the leaf and having one end portion projecting beyond the pivot and engageable with said attaching bracket, the opposite end portion underlying the frame and formed with a finger grip, an anti-glare plate provided on its upper portion with a hanger fixture, and a pivotal connection between said fixture and the adjacent portion of said frame.

2. In a structure of the class described, a glare shield, and means for attaching said shield to a relatively stationary support, said means comprising an attaching bracket formed with spaced eyes and a pivot pin carried by said eyes, said pivot pin being disposed in a horizontal plane, a coupling leaf hingedly connected to the pivot pin at a point between said eyes, an expansible and contractible supporting frame composed of a plurality of pivotally connected links, said frame having a pair of its links overlapped and arranged in superposed relation on said leaf, a lever, a pivot forming rivet extending through the overlapped links, leaf and intermediate portion of said lever for simultaneously connecting said parts together in assembled relationship, the free end portion of said lever being arranged to bear against said attaching bracket, the opposite end portion thereof underlying said frame and being formed with a finger grip.

ROBERT J. J. EISENZOPF.
ROBERT J. EISENZOPF.